US009593606B2

(12) United States Patent
Popadiuc

(10) Patent No.: US 9,593,606 B2
(45) Date of Patent: Mar. 14, 2017

(54) SUPPRESSOR FOR GASEOUS FUEL SYSTEM

(71) Applicant: Electro-Motive Diesel, Inc., LaGrange, IL (US)

(72) Inventor: Ovidiu Petru Popadiuc, Bensenville, IL (US)

(73) Assignee: Electro-Motive Diesel, Inc., La Grange, IL (US)

(*) Notice: Subject to any disclaimer, the term of this patent is extended or adjusted under 35 U.S.C. 154(b) by 0 days.

(21) Appl. No.: 14/877,485

(22) Filed: Oct. 7, 2015

(65) Prior Publication Data

US 2016/0097309 A1 Apr. 7, 2016

Related U.S. Application Data

(60) Provisional application No. 62/060,863, filed on Oct. 7, 2014.

(51) Int. Cl.
| | | |
|---|---|---|
| *F01N 1/00* | (2006.01) | |
| *F01N 1/04* | (2006.01) | |
| *F02M 21/02* | (2006.01) | |

(52) U.S. Cl.
CPC ............... *F01N 1/006* (2013.01); *F01N 1/00* (2013.01); *F01N 1/04* (2013.01); *F02M 21/0293* (2013.01); *F01N 2490/155* (2013.01); *F02M 21/0239* (2013.01); *F02M 21/0287* (2013.01); *F02M 21/0296* (2013.01)

(58) Field of Classification Search
CPC ... F01N 1/04; F01N 1/00; F01N 1/006; F01N 2490/155

USPC ............ 123/434, 525–527, 531, 533, 27 GE
See application file for complete search history.

(56) References Cited

U.S. PATENT DOCUMENTS

| | | | |
|---|---|---|---|
| 3,233,697 A * | 2/1966 | Slayter | B01D 53/944 181/245 |
| 3,718,206 A | 2/1973 | Gibel | |
| 3,955,643 A * | 5/1976 | Clark | F01N 1/00 181/248 |
| 4,244,442 A | 1/1981 | Scarton et al. | |
| 7,383,912 B2 | 6/2008 | Kondo et al. | |
| 8,356,090 B2 | 1/2013 | Wakatsuki | |
| 8,602,157 B2 | 12/2013 | Luttig et al. | |
| 2002/0185334 A1* | 12/2002 | Kim | F01N 1/006 181/279 |
| 2011/0011670 A1* | 1/2011 | Ishida | F01N 1/04 181/247 |

(Continued)

*Primary Examiner* — Mahmoud Gimie
(74) *Attorney, Agent, or Firm* — Finnegan, Henderson, Farabow, Garrett & Dunner, LLP

(57) ABSTRACT

A suppressor for a gaseous fuel system is disclosed. The suppressor may include a cylindrical body having a first end opposite a second end along an axis. A vent opening may be disposed at the second end. A conduit may pass through the first end and may have an inlet disposed outside the cylindrical body and an outlet disposed inside the cylindrical body. The suppressor may include an acoustic core between the outlet of the conduit and the vent opening and configured to reduce a sound level of fluids exiting the conduit. The suppressor may include a thermal mass between the outlet of the conduit and the vent opening, wherein the thermal mass includes fluid channels and is configured to transfer heat energy to fluids exiting the conduit.

20 Claims, 3 Drawing Sheets

(56) References Cited

U.S. PATENT DOCUMENTS

2012/0261211 A1\* 10/2012 Tomerlin .................. F01N 1/24
                                                                  181/256
2013/0048416 A1    2/2013 Pradhan \* cited by examiner

SUPPRESSOR FOR GASEOUS FUEL SYSTEM

RELATED APPLICATIONS

This application is based on and claims priority to U.S. Provisional Application No. 62/060,863 filed on Oct. 7, 2014, the contents of which are expressly incorporated herein by reference.

TECHNICAL FIELD

The present disclosure relates generally to a gaseous fuel system and, more particularly, to a suppressor for a gaseous fuel system.

BACKGROUND

Gaseous fuel systems commonly include a fuel tank and fuel lines leading to a stationary or mobile consumer, such as a locomotive engine. Periodically, the systems should be evacuated to maintain a desired pressure or when fuel lines are to be disconnected.

Ventilation of fuel lines to atmospheric conditions can generate long penetration sprays having a low temperature and/or a high level of noise. It is desirable to control the expansion of vented gas to reduce the penetration depth and also the temperature and sound level of the gas to within acceptable limits. This is often accomplished by placing a suppressor over an end of the vent line. However, known suppressors are designed with a focus on reducing the sound level without specific regard to a temperature of the vented fluid. Further, typical suppressors become clogged over time, resulting in increased backpressure on the fuel system and requiring periodic replacement.

An exemplary suppressor is disclosed in U.S. Pat. No. 3,718,208 (the '208 patent) that issued to Gibel on Feb. 27, 1973. The '208 patent discloses a suppression device for pneumatically operated tools and pressurized systems where a backpressure of the system must not exceed a predetermined value. The device comprises a domed head, a cylindrical body, and an end closure. An opening of the head is threaded so the device can be connected to an exhaust pipe. An expansion chamber and a silencing chamber are disposed inside the device and separated by a porous disseminator. The silencing chamber comprises a tubular wall of highly porous material that provides a tortuous flow path through which fluid passes and loses energy as it is exhausted. When the porous material becomes clogged, pressure in the device increases and forces open a valve that is normally kept closed by a spring. When the valve is forced open, noise produced by the system increases and warns the operator that the device needs to be replaced.

Although the device of the '208 patent may be somewhat effective at suppressing sound levels, its effectiveness is reduced after it becomes clogged. In particular, sound levels may not always be suppressed to a desired level because the sound increases when the device clogs and the valve is opened. Clogging can require periodic replacement, which raises a cost of operation. The device may also lack broad applicability to vent gases that undergo a significant temperature change during suppression.

The disclosed suppressor is directed to overcoming one or more of the problems set forth above and/or other problems of the prior art.

SUMMARY

In one aspect, the present disclosure is directed to a suppressor for a gaseous fuel system. The suppressor may include a cylindrical body having a first end opposite a second end along an axis. A vent opening may be disposed at the second end. A conduit may pass through the first end and may have an inlet disposed outside the cylindrical body and an outlet disposed inside the cylindrical body. The suppressor may include an acoustic core between the outlet of the conduit and the vent opening and configured to reduce a sound level of fluids exiting the conduit. The suppressor may include a thermal mass between the outlet of the conduit and the vent opening, wherein the thermal mass includes fluid channels and is configured to transfer heat energy to fluids exiting the conduit.

In another aspect, the present disclosure is directed to a gaseous fuel system. The gaseous fuel system may include a fuel tank, an engine, and a fuel line fluidly connecting the fuel tank and the engine. A ventilation line may fluidly connect the fuel line to the atmosphere, and a suppressor may be fluidly connected to an end of the ventilation line. The suppressor may include a cylindrical body having a first end opposite a second end along an axis. The suppressor may also include a vent opening disposed at the second end. A conduit may pass through the first end and have an inlet disposed outside the cylindrical body and an outlet disposed inside the cylindrical body. The suppressor may include an acoustic core between the outlet of the conduit and the vent opening and configured to reduce a sound level of fluids exiting the conduit. The suppressor may include a thermal mass between the outlet of the conduit and the vent opening, wherein the thermal mass includes fluid channels and is configured to transfer heat energy to fluids exiting the conduit.

In another aspect, the present disclosure is directed to a suppressor for a gaseous fuel system. The suppressor may include a cylindrical body having a first end opposite a second end along an axis, and a vent opening being disposed at the second end. The suppressor may also include a conduit passing through the first end and having an inlet disposed outside the cylindrical body and an outlet disposed inside the cylindrical body. The suppressor may include a diffuser connected to the outlet of the conduit, and an acoustic core located downstream of the diffuser. The acoustic core may include a sound-absorbing material and one or more acoustic structures configured to promote gas expansion, gas temperature increase, and sound attenuation. The suppressor may include a thermal mass between the outlet of the conduit and the vent opening, wherein the thermal mass includes fluid channels and is configured to transfer heat energy to fluids exiting the conduit.

DETAILED DESCRIPTION

Figure 1:
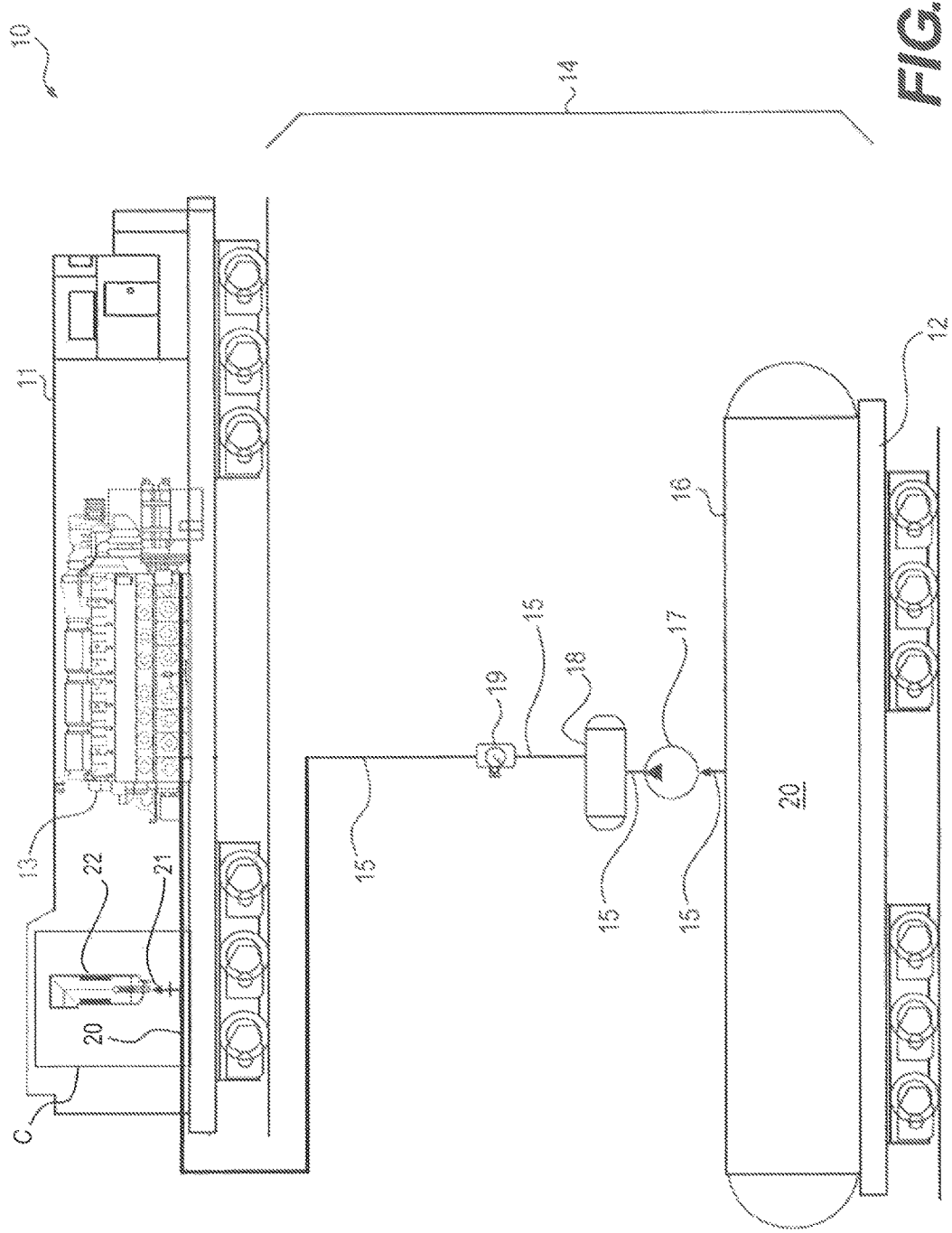
FIG. 1 is a diagrammatic illustration of an exemplary disclosed gaseous fuel system.

FIG. 1 illustrates an exemplary gaseous fuel system 14. In the embodiment shown in FIG. 1, gaseous fuel system 14 is associated with a mobile application, specifically a train consist 10. Train consist 10 may have one or more locomotives 11 and a tender car 12. Locomotive 11 may be coupled to tow tender car 12, and tender car 12 may be configured to support a fuel tank 16 and provide fuel via gaseous fuel system 14 to one or more fuel consumers, such as engine(s)

13 of locomotive 11. It should be noted, however, that gaseous fuel system 14 could be associated with other mobile or stationary applications associated having a fuel consumer, as desired.

Gaseous fuel system 14 may include multiple components that cooperate to provide a gasified fuel (e.g., natural gas) to engine(s) 13 in a regulated manner. These components may include, among other things, a fuel tank 16 storing a liquid fuel, a pump 17 configured to draw fuel from fuel tank 16, an accumulator 18 configured to hold a supply of gaseous fuel at high-pressure, and one or more pressure reducing mechanisms fluidly connected to gaseous fuel system 14. One such mechanism may be a regulator 19 disposed within fuel line 15 that connects accumulator 18 to engine(s) 13 and regulates a pressure of the gaseous fuel supply directed to engine(s) 13. Another pressure reducing mechanism may include a ventilation line 20 fluidly connecting fuel line 15 to the atmosphere via a pressure relief valve 21 and a suppressor 22.

Fuel tank 16 may embody a cryogenic fuel tank configured to hold the natural gas in a liquefied state. In the exemplary embodiment, fuel tank 16 is an insulated fuel tank that maintains a temperature of the natural gas below a boiling temperature of about −165° C. It is contemplated that fuel tank 16 may be provided with conventional equipment for handling liquefied natural gas (LNG), for example chillers, circulators, heaters, ventilators, etc., as desired. Fuel tank 16 may be supported on tender car 12.

Pump 17 may be any type of pump known in the art for handling natural gas in its liquid state (LNG) and/or gaseous state. In particular, at any point between fuel tank 16 and accumulator 18 (e.g., upstream and/or downstream of pump 17), the LNG may gasify. In the disclosed exemplary embodiment, the LNG is gasified downstream of pump 17 and pump 17 is configured to handle only LNG. In this embodiment, pump 17 includes a fixed displacement pumping device (e.g., a piston, diaphragm or rotor pump) that is powered by a variable speed drive. With this configuration, although the displacement of pump 17 may be fixed, the output of pump 17 may still be varied by adjusting the speed of the drive. It is contemplated that other types of pumps may alternatively be utilized to push natural gas through fuel line 15, if desired, for example a variable displacement pump.

Accumulator 18 may embody a high-pressure vessel configured to store pressurized natural gas for future use by engine(s) 13. As a pressure of the natural gas from pump 17 exceeds a pressure of accumulator 18, the natural as may flow into accumulator 18. Because the natural gas therein is compressible, it may act like a spring and compress as more natural gas flows in. When the pressure of the natural gas in fuel line 15 drops below the pressure of accumulator 18, the compressed natural gas may expand and exit accumulator 18. It is contemplated that accumulator 18 may alternatively embody a membrane/spring-biased or bladder type of accumulator, if desired.

Regulator 19 may allow gaseous fuel to discharge from accumulator 18 through fuel line 15 in a controlled manner. For example, regulator 19 may reduce high-pressure discharges from accumulator 18 to a lower pressure that may be suitable for delivery to engine(s) 13. To quickly reduce fuel pressure within gaseous fuel system 14, ventilation line 20 may fluidly connect fuel line 15 to the atmosphere via pressure relief valve 21. Pressure relief valve 21 may be configured to selectively allow gaseous fuel to discharge from fuel line 15 through ventilation line 20.

Because discharged fuel may get very cold and produce a loud noise during rapid ventilation, suppressor 22 may be fluidly connected to an end of ventilation line 20 downstream of pressure relief valve 21. Suppressor 22 may be configured to release vented gas into the atmosphere in a controlled manner (i.e., at a controlled temperature and sound level) that does not compromise the integrity of suppressor 22 or nearby objects. For instance, suppressor 22 may be disposed within a compartment C within locomotive 11 or another component of consist 10. Suppressor 22 may be configured to release, promote expansion of, and increase the temperature of vented gas in a controlled manner that does not compromise the integrity of compartment C or its contents.

Figure 2:
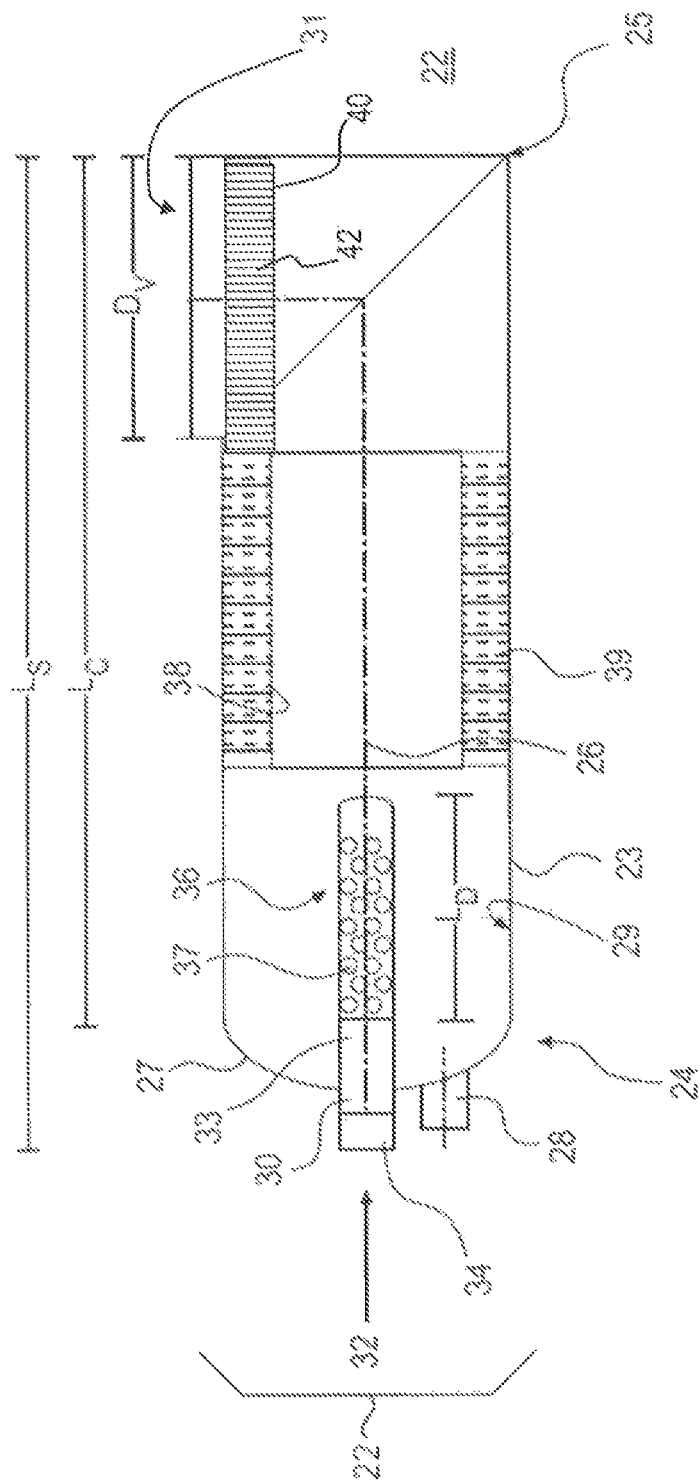
FIGS. 2 and 3 are diagrammatic sectional illustrations of a suppressor that may be used with the gaseous fuel system of FIG. 1.
Figure 3:
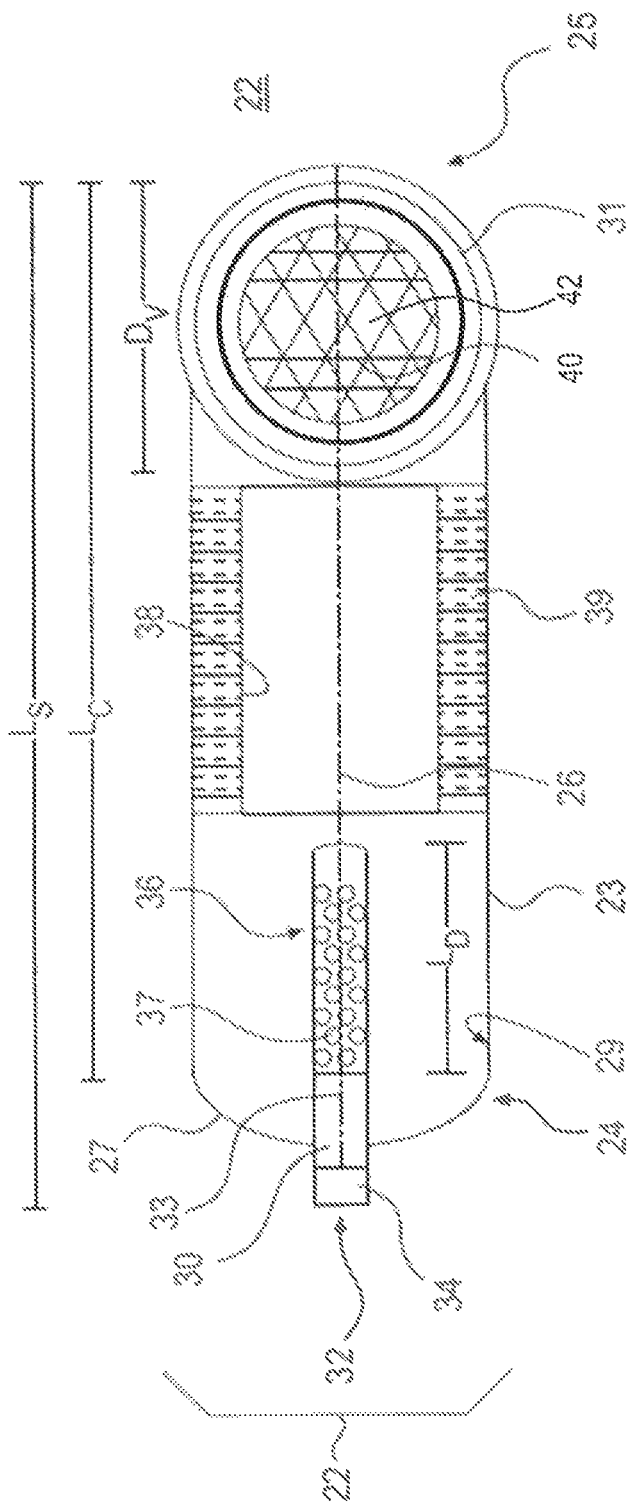

FIGS. 2 and 3 illustrate cross-sectional views of an exemplary suppressor. Suppressor 22 may include a cylindrical body 23 of length $L_C$ that has a first end 24 opposite a second end 25 along an axis 26. First end 24 may have a domed face 27, with a drain 28 (seen only in FIG. 2) extending from domed face 27. Alternatively, drain 28 may be disposed in an annular wall 29 of cylindrical body 23, if desired.

Suppressor 22 may further include a conduit 30 passing through first end 24 of cylindrical body 23, and a vent opening 31 disposed at the second end 25 of the cylindrical body 23. Conduit 30 may have an inlet 32 located outside of cylindrical body 23, and an outlet 33 located inside of cylindrical body 23. A connector 34 located at inlet 32 of conduit 30 may be used to connect suppressor 22 to ventilation line 20 (referring to FIG. 1). Connector 34 may be any suitable type of connector, such as pipe threads. Vent opening 31 may be generally concentric with axis 26, and oriented generally orthogonal to a flow direction in conduit 30. A bird screen may be disposed in vent opening 31 to prevent birds and/or environmental debris from entering suppressor 22.

Conduit 30 may extend inside of cylindrical body 23 to connect with a diffuser 36. Diffuser 36 may include a perforated surface 37. An acoustic core 38 may be located downstream of diffuser 36 and upstream of vent opening 31.

Acoustic core 38 may be attached to annular wall 29 inside cylindrical body 23 and extend axially between diffuser 36 and vent opening 31. Acoustic core 38 may include sound-absorbing materials that reduce the noise level of vented gas to acceptable levels. Acoustic core 38 may have any suitable length and thickness for sufficiently reducing the noise level of vented gas. For example, acoustic core 38 may extend from substantially immediately downstream of diffuser 36 to substantially immediately upstream of vent opening 31. Further, acoustic core 38 may have any suitable thickness for reducing noise levels without increasing back pressure in the fuel system to undesirable levels.

Acoustic core 38 may include one or more acoustic structures 39 that may be configured to promote gas expansion and gas temperature increase within cylindrical body 23 by fracturing and multiplying pressure waves. Acoustic structures 39 may include, for example, baffles, fins, compartments or similar known features for fracturing and multiplying pressure waves. Acoustic structures 39 may also be configured to promote sound attenuation. Acoustic core 38 may also include a sound-absorbing material, such as gas fiber roving, to further reduce the noise level of vented gas to acceptable levels.

Suppressor 22 may also include a thermal mass 40 disposed within cylindrical body 23. Thermal mass 40 may be configured to transfer heat to fluids passing through suppressor 22 in order to promote fluid expansion and increase the temperature of the fluid to a desire temperature. Referring again to FIG. 2, thermal mass 40 may be disposed in or near vent opening 31. In other embodiments, thermal mass 40 may be disposed at other locations within first or second end 24, 25. For example, thermal mass 40 may be positioned upstream or downstream of acoustic core 38. In some embodiments, thermal mass 40 may be positioned within or made integral with acoustic core 38. It is understood that thermal mass 40 may be positioned at other locations within cylindrical body 23, if desired.

Thermal mass 40 may include one or more channels 42 configured to allow fluids to flow through thermal mass 40. Channels 42 may be discrete channels, conduits, passages, or other structures for passing fluids. For example, thermal mass 40 may include a solid material having holes, bores, or other structures formed within the material to allow fluid to pass through. In other embodiments, thermal mass 40 may be a mesh, screen, foam, sponge, or other porous material having uniform or non-uniform spaces or voids that are configured to allow fluids to flow through.

Channels 42 may be configured to achieve desired thermal storage and heat transfer properties within thermal mass 40. For example, an overall porosity of thermal mass 40 may be altered to achieve certain operational parameters, such as desired flow rate characteristics through thermal mass 40, a particular degree of surface area contact of thermal mass 40 with passing fluids, and/or a thermal energy storage capacity. By optimizing porosity, improved heat transfer between thermal mass 40 and passing fluids may be achieved while ensuring thermal mass 40 is able to store sufficient amounts of heat energy. Porosity of thermal mass 40 may be altered by varying certain parameters, such as the number of channels 42, the diameter (or other dimension) of each channel 42, the spacing between channels 42, and/or the number of channels 42 per unit area or unit volume. As porosity decreases, the thermal energy storage capacity of thermal mass 40 increases while the volume of space for fluid flow decreases. By optimizing the design and geometry of thermal mass 40 and its passages 42, the flow rate of fluids through thermal mass 40 and heat transfer rate to the fluids may be improved while ensuring sufficient mass is available for storing heat energy within thermal mass 40.

Due to the relatively low temperatures of vented fuels (e.g., about −165° C. in some cases), thermal mass 40 may be constructed of materials configured to withstand exposure to fluids at such low temperatures. For example, thermal mass 40 may be constructed of stainless steel. In particular, whereas some carbon steels may crack or otherwise fail at such low temperatures, certain stainless steels and stainless steel alloys may allow thermal mass 40 to retain sufficient thermal energy to adequately expand vented gases without being damaged by exposure to such low temperatures. Suitable stainless steels used to construct thermal mass 40 may include those that can embody, for example, a billet portion configured to have channels 42 formed therein, a cast or extruded portion having integral channels 42, or a mesh, foam, or sponge formed by any suitable means of manufacturing (e.g., shaving and weaving, casting, extruding, additive manufacturing, etc.).

Components of suppressor 22 may be designed to control the expansion of fuel inside suppressor 22, so as to increase the temperature and reduce the noise level of the vented gas. In one embodiment, to effectively achieve acceptable temperature and noise levels, suppressor 22 dimensions may satisfy the following relationships. First, a suppressor length $L_S$ from inlet 32 of conduit 30 to second end 25 of cylindrical body 23 should be about equal to 3.5 to 3.6 times a vent opening diameter $D_V$. If this range is exceeded, vented gas may remain in suppressor 22 for too long and may increase backpressure in the fuel system. If this range is not met, vented gas may not remain inside suppressor 22 long enough to be sufficiently increased in temperature or reduced in sound level. Second, a diffuser length $L_D$ should be about equal to 0.22 to 0.23 times a cylindrical body length $L_C$. If this range is exceeded, vented gas may reside within diffuser 36 for too long, and may not be sufficiently exposed to acoustic core 38 within cylindrical body 23. If this range is not met, vented gas may not be sufficiently diffused and penetrating sprays may be released from suppressor 22. Third, a cross-sectional flow area of the diffuser 36 should be about equal to 0.03 to 0.35 times an area of vent opening 31. If this range is exceeded, vented gas may not have sufficient space to expand and may not be sufficiently increased in temperature and reduced in sound level before exiting suppressor 22. If this range is not met, vented gas may not be sufficiently diffused and penetrating sprays may be released from suppressor 22.

Finally, a flow area of perforated surface 37 of diffuser 36 should be about equal to 6.9 to 8.4 times an area of outlet 33 of conduit 30. If this range is exceeded, gases may expand too quickly before reaching acoustic core 38 and may generate additional noise. If this range is not met, vented gas may not be sufficiently diffused and penetrating sprays may be released from suppressor 22.

INDUSTRIAL APPLICABILITY

The disclosed suppressor may be applicable to any gaseous fuel system where pressurized fuel is vented to the atmosphere and where it is desirable to regulate a temperature and a sound level of the vented gas. The disclosed suppressor may increase the temperature of the vented gas, while simultaneously reducing the sound level of the vented gas to acceptable levels by fracturing and multiplying pressure waves using acoustic structures and sound-attenuating materials. Operation of gaseous fuel system 14 will now be discussed.

Pressurized gaseous fuel may exit fuel tank 16 (referring to FIG. 1) through fuel line 15 and enter accumulator 18. Pump 17 may draw fuel from fuel tank 16 into fuel line 15. Regulator 19 may regulate fuel pressure in fuel line 15 between accumulator 18 and engine(s) 13. If pressure in fuel line 15 exceeds acceptable limits, fuel may be relieved through ventilation line 20. Pressure relief valve 21 may open when fuel pressure in fuel line 15 exceeds the acceptable limits, and close when the pressure reduces to below the acceptable limits. Pressure relief valve 21 may guide fuel through suppressor 22 before it is released into the atmosphere.

Fuel may enter suppressor 22 from ventilation line 20 through conduit 30 and may be released into cylindrical body 23 through diffuser 36. While passing through diffuser 36, fuel may be diffused and dispersed throughout cylindrical body 23. After passing through diffuser 36, fuel may pass through acoustic core 38 before reaching vent opening 31. Acoustic core 38 may fracture and multiply internal pressure waves to cause wave cancellation, resulting in a temperature increase and a noise reduction of vented gas. Acoustic core 38 may also absorb sound waves to further reduce the noise level of vented gas to an acceptable level.

After passing through acoustic core 38, fluid may pass through thermal mass 40 and be further increased in temperature. As fluid passes through channels 42 of thermal mass 40, heat energy stored within thermal mass 40 may be transferred to the fluid, thereby increasing the fluid's temperature and causing it to expand. Thermal mass 40 may also function to block the passage of liquid portions of fluid from exiting suppressor 22 without first being heated and expanded. In this way, thermal mass 40 may ensure that passing fluids are sufficiently expanded and increased in temperature so as to reduce the effects on nearby objects of exposure to low temperature vented fluids.

After passing through thermal mass 40, gas may be released into the atmosphere through vent opening 31 at the second end 25 of cylindrical body 23, at a higher temperature and at a reduced sound level that are both within acceptable limits. For example, at 300 horizontal feet from vent opening 31, suppressor 22 may reduce the noise level of a vented natural gas fuel from 88.1 decibels to 69.9 decibels, or by 20.7 percent (average sound level of octave bands ranging from 32 to 8000 hertz). Further, suppressor 22 may be configured to increase the temperature of fuel, such as liquid natural gas, stored at a cryogenic temperature of about −165° C. (−265° F.) to a vented temperature of about 45° C. (113° F.) when gaseous fuel system 14 is vented to atmospheric conditions.

Several advantages may be associated with the disclosed suppressor. For example, because the disclosed suppressor increases temperature and decreases sound level values of vented gas by fracturing and multiplying pressure waves with an acoustic core instead of by forcing the gas through porous materials, the suppressor does not become clogged and does not require periodic replacement. As a result, operating costs and maintenance requirements are lowered. Further, because the disclosed suppressor does not become clogged, consistent temperature and sound level values can be achieved without regular maintenance.

It will be apparent to those skilled in the art that various modifications and variations can be made to the disclosed suppressor and ventilation system. Other embodiments will be apparent to those skilled in the art from consideration of the specification and practice of the disclosed ventilation system. It is intended that the specification and examples be considered as exemplary only, with a true scope being indicated by the following claims and their equivalents.

What is claimed is:

1. A suppressor for a gaseous fuel system comprising:
   a cylindrical body having a first end opposite a second end along an axis;
   a vent opening being disposed at the second end; and
   a conduit passing through the first end and having an inlet disposed outside the cylindrical body and an outlet disposed inside the cylindrical body,
   an acoustic core between the outlet of the conduit and the vent opening and configured to reduce a sound level of fluids exiting the conduit; and
   a thermal mass between the outlet of the conduit and the vent opening, wherein the thermal mass includes fluid channels and is configured to transfer heat energy to fluids exiting the conduit.

2. The suppressor of claim 1, further including a diffuser connected to the outlet of the conduit.

3. The suppressor of claim 2, wherein the diffuser includes a perforated surface.

4. The suppressor of claim 3, wherein a flow area of the perforated surface is about equal to 6.9 to 8.4 times an area of the outlet of the conduit.

5. The suppressor of claim 3, wherein a diffuser length is about equal to 0.22 to 0.23 times a cylindrical body length.

6. The suppressor of claim 3, wherein an area of the diffuser is about equal to 0.03 to 0.35 times an area of the vent opening.

7. The suppressor of claim 1, wherein a length from the inlet of the conduit to the second end of the cylindrical body is about equal to 3.5 to 3.6 times a vent opening diameter.

8. The suppressor of claim 1, wherein the vent opening is generally concentric with the axis of the cylindrical body and generally orthogonal to a flow direction through the conduit.

9. The suppressor of claim 8, further including:
   a domed face at the first end of the cylindrical body; and
   a drain disposed in the domed face.

10. The suppressor of claim 7, wherein the acoustic core further includes:
    a sound-absorbing material; and
    one or more acoustic structures configured to promote gas expansion, gas temperature increase, and sound attenuation.

11. A gaseous fuel system comprising:
    a fuel tank;
    an engine;
    a fuel line fluidly connecting the fuel tank and the engine;
    a ventilation line fluidly connecting the fuel line to the atmosphere; and
    a suppressor fluidly connected to an end of the ventilation line, the suppressor comprising:
      a cylindrical body having a first end opposite a second end along an axis;
      a vent opening being disposed at the second end;
      a conduit passing through the first end and having an inlet disposed outside the cylindrical body and an outlet disposed inside the cylindrical body,
    an acoustic core between the outlet of the conduit and the vent opening and configured to reduce a sound level of fluids exiting the conduit; and
    a thermal mass between the outlet of the conduit and the vent opening, wherein the thermal mass includes fluid channels and is configured to transfer heat energy to fluids exiting the conduit.

12. The gaseous fuel system of claim 11, further including a diffuser connected to the outlet of the conduit.

13. The gaseous fuel system of claim 12, wherein the diffuser includes a perforated surface.

14. The suppressor of claim 13, wherein a flow area of the perforated surface is about equal to 6.9 to 8.4 times an area of the outlet of the conduit.

15. The gaseous fuel system of claim 13, wherein diffuser length is about equal to 0.22 to 0.23 times a cylindrical body length.

16. The gaseous fuel system of claim 13, wherein an area of the diffuser is about equal to 0.03 to 0.35 times an area of the vent opening.

17. The gaseous fuel system of claim 11, wherein a length from the inlet of the conduit to the second end of the cylindrical body is about equal to 3.5 to 3.6 times a vent opening diameter.

18. The gaseous fuel system of claim 11, wherein the vent opening is generally concentric with the axis of the cylindrical body and generally orthogonal to a flow direction through the conduit.

19. The gaseous fuel system of claim 18, further including:
    a domed face at the first end of the cylindrical body; and
    a drain disposed in the domed face.

20. A suppressor for a gaseous fuel system comprising:
a cylindrical body having a first end opposite a second end along an axis;
a vent opening being disposed at the second end;
a conduit passing through the first end and having an inlet disposed outside the cylindrical body and an outlet disposed inside the cylindrical body;
a diffuser connected to the outlet of the conduit;
an acoustic core located downstream of the diffuser, the acoustic core including:
   a sound-absorbing material;
   one or more acoustic structures configured to promote gas expansion, gas temperature increase, and sound attenuation; and
   a thermal mass between the outlet of the conduit and the vent opening, wherein the thermal mass includes fluid channels and is configured to transfer heat energy to fluids exiting the conduit.

\* \* \* \* \*